(12) United States Patent
Murtha

(10) Patent No.: US 8,333,480 B1
(45) Date of Patent: Dec. 18, 2012

(54) SOLAR CONCENTRATING WEDGE

(76) Inventor: R. Michael Murtha, Oxnard, CA (US)

( * ) Notice: Subject to any disclaimer, the term of this patent is extended or adjusted under 35 U.S.C. 154(b) by 0 days.

(21) Appl. No.: 13/278,290

(22) Filed: Oct. 21, 2011

(51) Int. Cl.
*G02B 5/10* (2006.01)
*F24J 2/10* (2006.01)
(52) U.S. Cl. ..................... 359/853; 126/692
(58) Field of Classification Search .............. 126/692
See application file for complete search history.

(56) References Cited

U.S. PATENT DOCUMENTS 4,074,704 A * 2/1978 Gellert ...................... 126/683

* cited by examiner

*Primary Examiner* — Jade R Chwasz

(57) ABSTRACT

Advanced stationary solar concentrating wedges are described. Using the latest collection optics, sunlight is directed into the wedge to produce a short hot focus. The wedge acceptance angle allows for a two-sided collector. A simple and sturdy non-tracking frame ensures that collected light will follow the intended path to the absorber. The scalable wedge will be useful in making steam for motive power and purified water for human consumption.

3 Claims, 3 Drawing Sheets

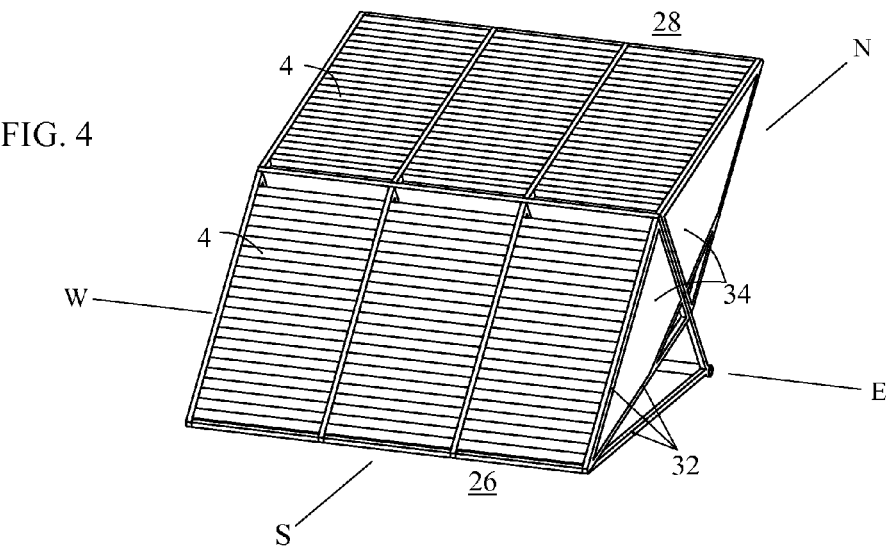
FIG. 4
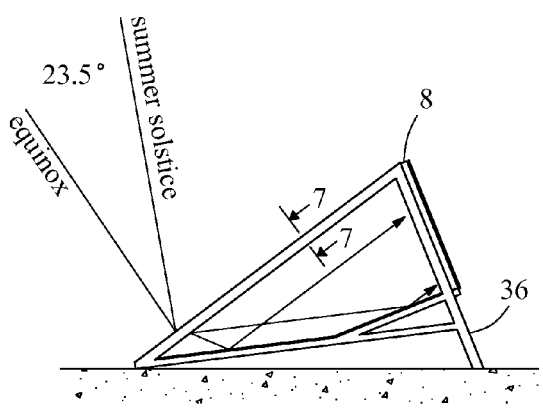
FIG. 5-A
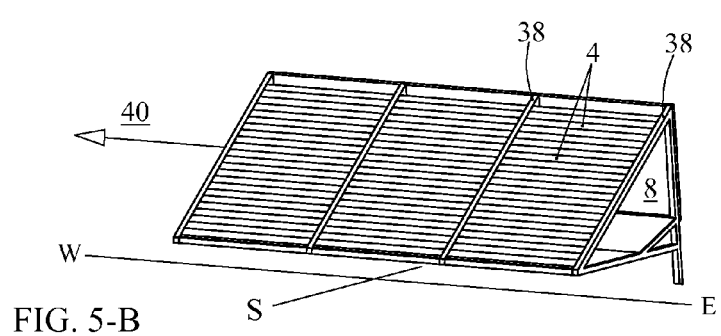
FIG. 5-B

US 8,333,480 B1

SOLAR CONCENTRATING WEDGE

BACKGROUND OF THE INVENTION

This invention relates to the collection of sunlight and specifically to improvements in a solar thermal concentrating collector.

By the 1970s, interest in solar energy collection had grown substantially. It was around that time that investigators developed a better understanding of stationary solar concentrators. This type of concentrator was attractive since it could potentially collect and focus light onto a pipe without following the sun.

One stationary solar concentrator had the general appearance of a "wedge" and early versions of the collector are represented in U.S. Pat. Nos. 4,074,704, 4,282,862 and 4,344,417. In each patent the inventor recognized that the focal temperature could be doubled if rays were initially directed into the wedge toward the focus. In order to achieve this, each inventor placed an array of prisms on top of the wedge. Prisms did have the unique ability to collect light with a wide acceptance angle, but there was a problem: the prisms could only direct rays weakly, by refraction. Without a complete solution for collecting and directing light, the wedge remained a low temperature solar concentrator.

In publication number US 2010/0165495, an optic is shown that is specifically designed to direct light into the wedge.

SUMMARY OF THE INVENTION

The primary object of this invention is to introduce advanced wedge solar concentrators that have been made possible by the latest collection optics.

Accordingly, the primary object is accomplished in the following manner: New equator side and pole side wedges are identified. The two sides are then brought together to form a single large-area solar concentrating wedge.

Another object is to present a stationary metal framework for the collector.

Yet another object is to show a light collection optic that is inexpensive to produce.

Other objects and advantages will become apparent from the following detailed description and accompanying drawings.

BRIEF DESCRIPTION OF THE DRAWINGS

FIG. 4 is a perspective view of the two-sided wedge frame.
FIG. 5-A is an end view of the basic wedge frame.
FIG. 5-B is a perspective view of the basic wedge frame.

DESCRIPTION OF THE INVENTION

Figure 1:
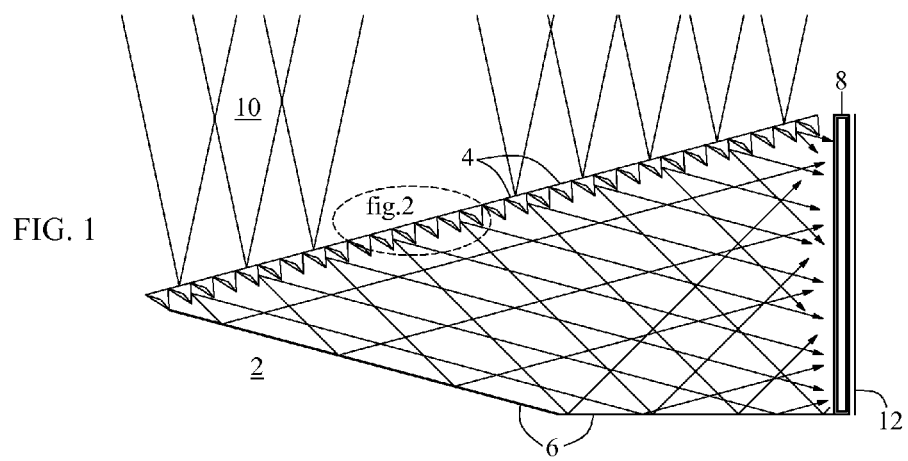
FIG. 1 is an end view of the new basic wedge.

Turning now to FIG. 1, there is shown a new solar concentrating wedge 2. The wedge is bounded by a row of collection optics 4 on top, bottom compound reflector 6 and absorber 8 on the side. Sunlight 10 is collected and directed by the optics diagonally into the wedge. Diagonal rays allow bottom reflector 6 to be tilted up, making the collector more compact. In this way, the collection optics have caused the absorber to be as short as possible and the absorber temperature to be as hot as possible. The wedge geometric concentration ratio (collector width divided by height) is about 2.2 (2.2× local sunlight intensity heats the absorber).

Wedge 2 is hollow and light passes through air to the blackened absorber wall. Absorber 8 contains flowing water and the metal wall transfers the solar thermal energy to the water. Having a relatively large area, the absorber is reinforced internally to withstand pressure and one wall has insulation 12 to reduce the loss of heat.

The purpose of the solar concentrating wedge is to boil water during the day, without tracking the sun. The value of the collector is that pure water, for human consumption and agriculture, can be obtained from any contaminated water source. Boiling water becomes steam and the steam condensate is captured as purified water. Concentrated light accelerates the distillation process, but the real advantage of the collector is that the work can now be done without costly sun-tracking machinery. From a different perspective, solar generated steam can also be used to power a steam engine without air pollution. For either process, it is the collector surface area that will determine the volume of steam produced and the steam can be plentiful since the wedge is scalable.

Figure 2:
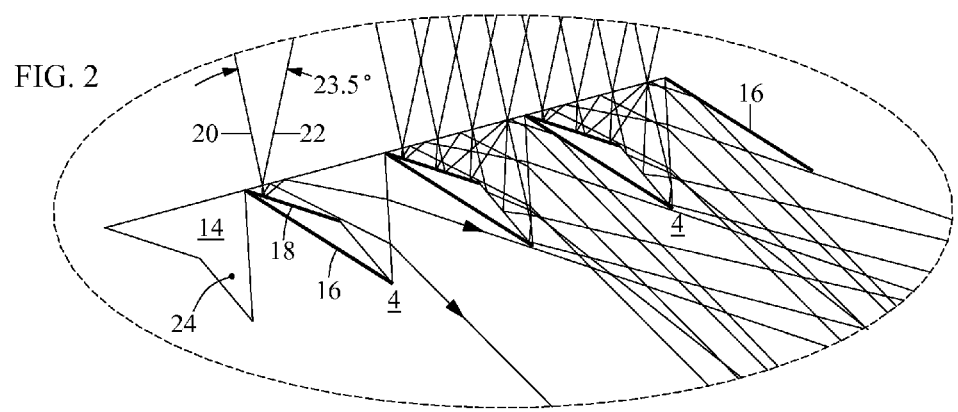
FIG. 2 is a detail view of the collection optics.

FIG. 2. Shown in cross-section, each optic 4 has three components: a four-sided prism 14 made of clear acrylic plastic, a reflector 16 made of polished aluminum sheet and a reflective silver layer 18. Originally disclosed as a large area prismatic plate, optic 4 now takes the form of a single prism and reflector set that is much easier to produce. The cornucopia-shaped prism 14 can now be molded to grip the reflector and allow self-fixturing within a frame.

Optic 4 combines the acceptance angle of a prism and the directionality of a reflector, collecting all light between rays 20 and 22 and having that light cleanly turn-the-corner into the wedge. When equinox ray 20, or solstice ray 22 enter the prism, silver layer 18 sends it up diagonally to the top surface for a total internal reflection, establishing the ray exit angle before it leaves the prism. Bottom facet 24 internally reflects all light that it collects, toward the absorber. Adjacent optics are arrayed at an angle to accommodate the prism top surface.

Optic 4 has a 23.5° acceptance angle that collects sunlight three months before and three months after summer solstice. The stationary wedge makes steam from March $21^{st}$ through September $21^{st}$, the brightest six months in the northern hemisphere. If tilted once, the collector can also work the other six months.

Figure 3:
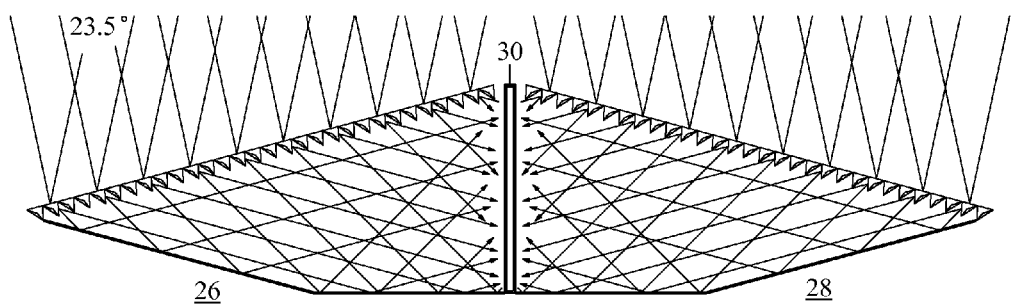
FIG. 3 is an end view of the two-sided wedge.

In FIG. 3, a two-sided wedge is shown for the first time. Sides 26 and 28 are identical, where one side has been rotated in relation to the other, with absorber 30 now being irradiated on both sides. This arrangement is made possible by the collection optic's 23.5° acceptance angle, which is centered overhead. The stationary collector has a geometric concentration of 4.4×.

FIG. 4 is a perspective view of two-sided wedge frame 32 constructed of welded square tubing. If end mirrors 34 were removed, it would be found that the interior is the same as in FIG. 3. Identical optics 4 are used on each side of the collector. The south side (equator side) 26 and north side (pole side) 28 form a "diamond" shape that is inherently stable.

FIG. 5-A is an end view of the wedge frame 36. The end mirror has been removed to show that the interior is the same as in FIG. 1. The stationary frame maintains the position of the optics and other components so that all collected light will follow the intended path to absorber 8. Frame 36 can be constructed with a specific tilt in elevation. In this case, the wedge has been built for 34° north latitude which includes Los Angeles, Calif. The non-tracking and scalable collector can be one foot wide or one hundred feet wide.

FIG. 5-B is a perspective view of the same collector. Optics 4 are fixtured between top rails 38. East-west collector length 40 will greatly influence the temperature rise and flow rate of the water inside absorber 8.

Figure 6:
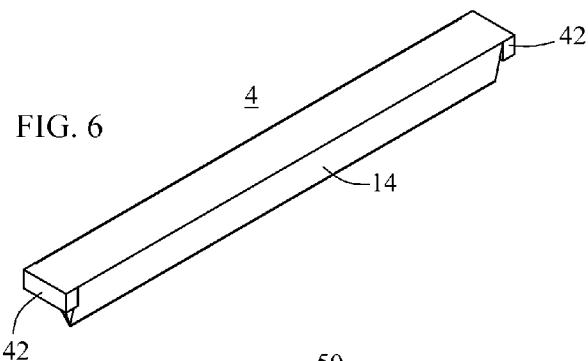
FIG. 6 is a perspective view of a collection optic.

In FIG. 6, the optic 4 assembly includes a reflector, silver layer and prism 14. The prism has been molded with small features that allow attachment of the reflector. Molded extensions 42 are for supporting the assembly between frame rails.

Figure 7:
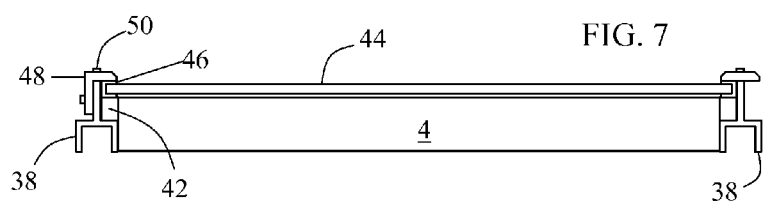
FIG. 7 is a sectional view of collection optic fixturing.

FIG. 7 is a sectional view (from FIG. 5-A) showing how each individual optic 4 can be fixtured to the frame. Extensions 42 are placed on the shoulder of top rails 38. Tempered glass sheet 44 and linear seal 46 rests on top of extension 42. Clamping rail 48 sits on top of seal 46. The weight of the glass and clamping rail forces all of the optics into a leveled state. Screws 50 are torqued lightly to allow differential thermal expansion between the sealed elements.

Figure 8:
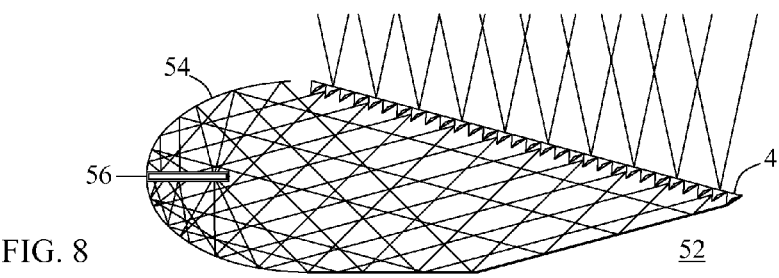
FIG. 8 is an end view of a pole side wedge with a secondary reflector.

In FIG. 8, pole side collector 52 is fitted with a secondary reflector. Optic 4 delivers six months of sunlight into the wedge and the rays are further focused by compound parabolic concentrator 54 onto absorber 56, giving a geometric concentration of about 5×.

Figure 9:
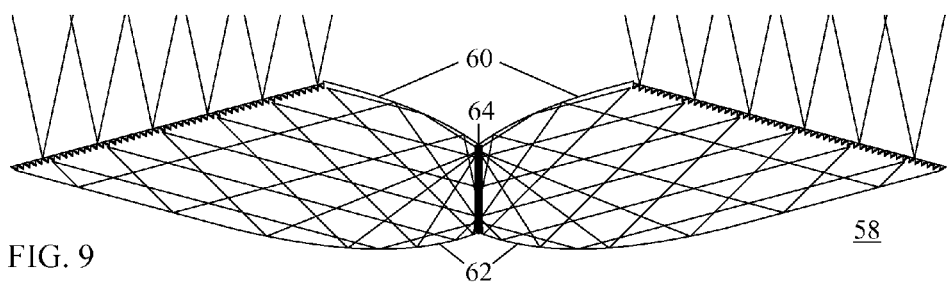
FIG. 9 is an end view of a two-sided wedge with a different secondary reflector.

In FIG. 9, two-sided stationary wedge 58 concentrates light with the assistance of parabolic secondary reflectors 60 and 62. Central absorber 64 receives a concentration of about 7×.

SUMMARY

The reader has been shown a family of solar concentrating wedges that will make steam and purified water. The wedge uses a highly effective optic for light collection. The stationary collector has no moving parts and therefore fewer maintenance and labor costs. Collector scalability allows lower manufacturing costs overall. There has always been a need for a cost effective non-tracking solar concentrator and now, the wedge has all the right features.

What is claimed is:

1. A hollow solar concentrating collector with one focus, the collector comprising:
   a) a nontracking frame;
   b) a plurality of linear prisms, each said prism having a wide acceptance angle, each prism having four sides in transverse cross section, said sides including a top surface and three bottom surfaces;
      said top surface for collecting incident light and simultaneously directing light by total internal reflection, all of the prism top surfaces arrayed coplanar and with abutting linear edges;
      a first said bottom surface sharing a linear edge with the top surface, the first bottom surface including a metal layer to reflect light up to the top surface;
      a second said bottom surface sharing a linear edge with the first bottom surface, the second bottom surface oriented to reflect light by total internal reflection at a predetermined angle;
      a third said bottom surface sharing a linear edge with the second bottom surface and the other linear edge with the top surface, whereby the third bottom surface transmits the light delivered by the other prism surfaces, through air toward the focus;
   c) a plurality of linear metal reflectors, each said reflector being coextensive with each said prism, each reflector having a long top edge and a long bottom edge, said reflector top edge disposed adjacent the prism edge shared by the top surface and first bottom surface, the reflector bottom edge extending diagonally to the prism edge shared by the second bottom surface and the third bottom surface;
   d) a compound reflector bottom;
   e) a linear absorber disposed in the collector focus, said absorber being substantially rectangular in transverse cross section, the absorber cross section having a long axis and a short axis.

2. The collector of claim 1, wherein each said linear prism has two ends, each end having a shoulder for sitting on said frame.

3. The collector of claim 1, wherein said frame includes clamping means for fixturing said prisms.

* * * * *